Aug. 18, 1931.  W. S. BAYLIS  1,819,496
ACTIVATED CLAY AND METHOD OF PRODUCING SAME
Filed May 22, 1926
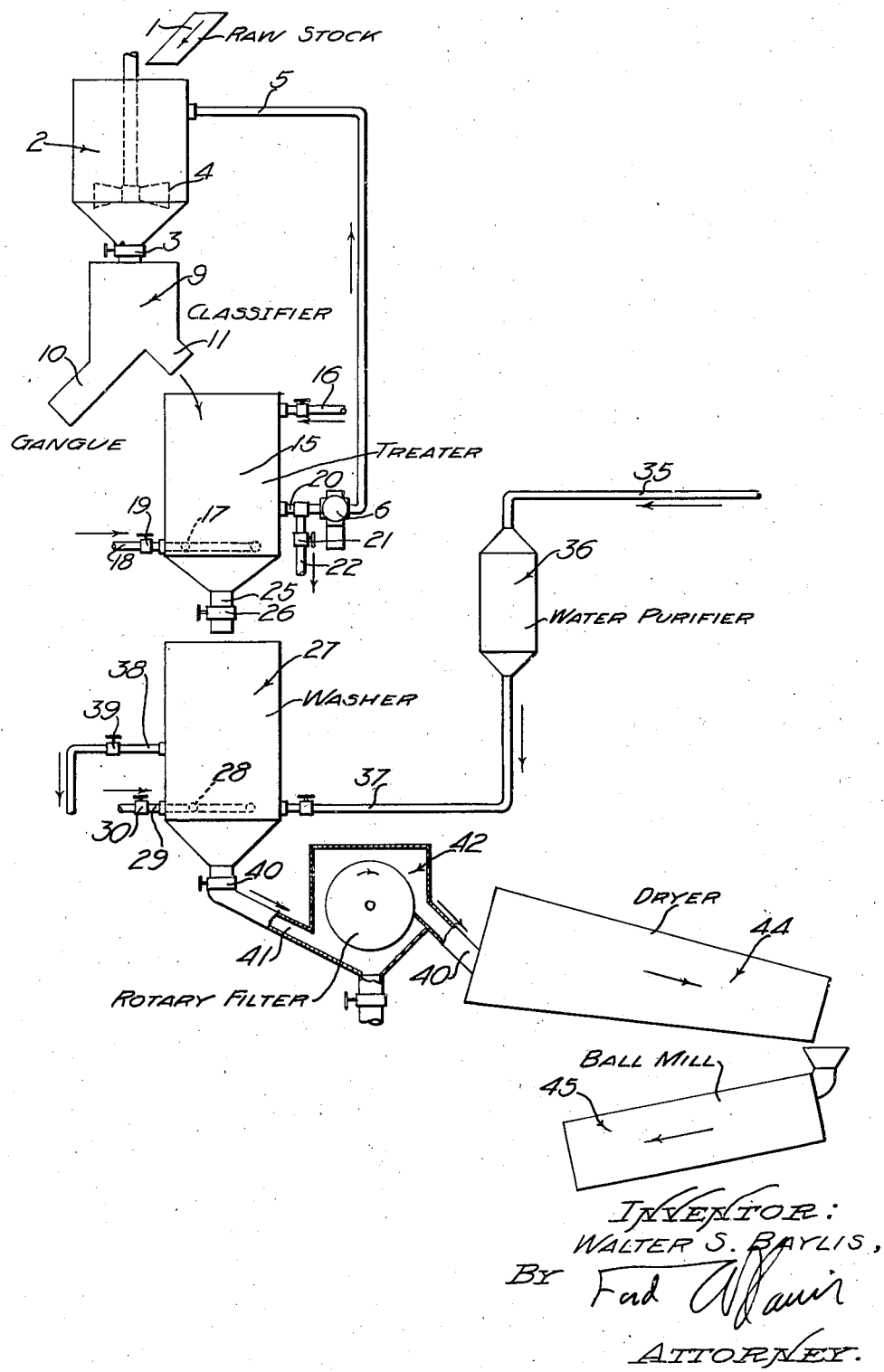

Patented Aug. 18, 1931

1,819,496

UNITED STATES PATENT OFFICE

WALTER S. BAYLIS, OF LOS ANGELES, CALIFORNIA, ASSIGNOR, BY MESNE ASSIGN-
MENTS, TO FILTROL COMPANY OF CALIFORNIA, OF LOS ANGELES, CALIFORNIA,
A CORPORATION OF CALIFORNIA

ACTIVATED CLAY AND METHOD OF PRODUCING SAME

Application filed May 22, 1926. Serial No. 110,961.

My invention relates to what have become known as activated clays. It is at the present time common practice to decolorize and purify oil, sugar syrups, fats, waxes, and other materials by means of activated clays. These activated clays are commonly produced by treating a suitable natural clay with sulphuric acid for the purpose of changing its chemical characteristics and putting it in such a physical condition that it has a remarkable affinity for the impurities carried in the materials which it is used to clarify and decolorize.

Different clays or clay-like substances respond differently to the process described here in regard to the degree of efficiency produced in the finished material, and it is necessary to subject any particular clay material to an actual test to determine whether it will be of commercial value as a raw material. The ultimate chemical analysis of the clays seems to be of no value in determining the adaptability of a given clay for the purpose in question, and while the type of minerals such as are usually known as Bentonite, Halloysite, etc., seem to be best suited for such purposes, the application of the process is not limited to these materials; moreover it is to be remembered that the usual definition of such minerals is rather vague and indefinite.

The treatment of the clay and handling of the material is performed in such a manner that the product obtained is of a very high efficiency and stability and also has the property of being capable of being reactivated after use, simply by burning off the impurities adsorbed, properties of utmost importance in the commercial valuation of the products. If a treated clay is not stable and cannot be reactivated it has no commercial value in comparison to a clay which has such properties; and therefore in the manufacture of a treated clay, which is stable and which will reactivate, the preservation of these properties during the process of manufacture is of utmost importance. This reactivation can ordinarily be accomplished by heating the clay but it is found in the commercial activated clays now available that each reactivation considerably reduces the potency of the clay as a purifying agent so that after several reactivations the clay becomes so modified that it is no longer an efficient decolorizing or purifying agent. This may be due to chemical reasons but is probably due to the fact that the repeated heating of the clays with their included impurities brings about a physical change in the porous structure of the clay particles which renders it less efficient.

It is an object of my invention to provide an activated clay which is stable and which may be repeatedly reactivated by heating without great loss in potency.

A further object of my invention is to provide novel means by which such a clay may be economically produced.

Further objects and advantages will be made evident hereinafter.

Activated clays embodying my invention may be produced by either a continuous or a batch system but for simplicity of description I will describe only a batch system which is illustrated in the accompanying drawing. Each element of the apparatus used therein is old and well known in the art and will not be described in detail, being shown merely diagrammatically.

In the operation of the process the raw clay, which may contain considerable gangue such as pebbles or the like, is delivered through a chute 1 into a mixer 2. The clays which I have found most suitable for the production of my novel product tend to disintegrate in water, and the valve 3 in the lower portion of the mixer 2 being closed, the mixer may be filled with water into which the raw stock is delivered and with which it is mixed by means of a mechanical agitator consisting of the paddles 4, or by any other suitable means. Where the clay is mixed with fresh water, the subsequent treatment thereof, as will be explained later, is not very satisfactory. For this reason in the place of using ordinary fresh water as a disintegrating agent I prefer to employ a weak or spent sulphuric acid having 12% to 20% of acid and using from 400 to 600 pounds of acid solution to a ton of clay. The acid solution is delivered to the mixer 2 through a pipe 5 by means of a pump 6. Acid solutions which have been used in the later described treatment of the clay may be economically used for this purpose.

The raw stock having been thoroughly mixed with the dilute acid in the mixer 2 is delivered through the valve 3 into a classifier 9. This classifier may be of any convenient form, any device which is capable of separating the pebbles, gravel and other foreign matter constituting the gangue from the pulp which it is desired to treat being suitable for this purpose. The gangue is delivered from the classifier 9 through a chute 10 and the pulp consisting of raw clay in the form of a paste or mud is delivered through the chute 11 into the treater 15. This treater may be of any convenient form (usually a lead lined vat) suited to mix and agitate the pulp with acid. Fresh acid is delivered to the treater 15 through the pipe 16 and the combined pulp and liquid therein may be agitated by means of air or steam blown upwardly therethrough from perforated pipes 17 fed with air or steam through a pipe 18 having a valve 19.

I have found that the quality of the product can be very materially increased if the agitation is carried on in the following manner. As a rule, the longer the treatment the better the product, but I find that a treatment of from three to ten hours is usually sufficient for commercial purposes. The regulation of the temperature during the treatment is of vital importance. I have discovered that the temperature readings during the treating process should form a curve, being lower at the start of the process, then rising to the boiling point towards the middle of the treating period or somewhat earlier, and then descending again to lower temperature towards the end of the process, the most advantageous finishing temperatures being about 160 to 200° F. while the initial temperature should range from 170° to 200° F., depending on the particular clay material to be treated. While some clays can be treated with an initial temperature as high as 200° F. without affecting the final absorptive efficiency of the finished product, others have to be started at a considerably lower temperature, say, 170° F., otherwise the efficiency of the resulting product is greatly impaired. During the process the contents of the tank are thoroughly agitated by means of live steam or air, or both, regulating the flow of each so that the desired temperatures can be maintained.

At the conclusion of the treating operation the pulp is allowed to settle in the treater 15 and the supernatent liquid may then be drawn off through a pipe 20, being delivered through a valve 21 and a pipe 22 to suitable drain or waste basin, or a portion of the solution which contains the spent acid may be delivered through the pump 6 and the pipe 5 to the mixer 2 where it is utilized to disintegrate and break down the raw material delivered through the chute 1. The pulp or treated material from the treater 15 is dumped through a chute 25 having a valve 26 into a washer 27 where it is thoroughly mixed with water and where it is subjected to continuous agitation which may be produced either mechanically or by means of air forced upwardly through perforated pipes 28 which are supplied with air from a pipe 29 having a valve 30. I have found that where the clay is washed with ordinary water, such as may be obtained from city mains and which may be regarded as of commercial purity, a clay is produced which cannot be reactivated without substantial loss of potency. After a careful investigation of the subject I am convinced that this is due to the presence in the water of calcium compounds which become attached to or incorporated in the activated clay, and which tend to adversely affect the physical characteristics of the clay when it is heated for reactivation.

It is therefore an object of my invention to not only remove from the clay all calcium and other salts having this effect (which is accomplished in part by the acid treatment) but also to prevent the reintroduction into the clay of some of these objectionable salts during the washing operation.

I have demonstrated that the presence of small quantities of calcium salts has an extremely deleterious effect on the potency of the clays after the clays have been reactivated. For the purpose of preventing the introduction of calcium salts into the clays I provide for the purification of the water used, this water being delivered from the source of supply through a pipe 35 into a water purifier 36. This water purifier may consist of a single piece of apparatus, as shown, or of several pieces, any type of commercial purifier which will remove from the water calcium and other salts being sufficient for my purpose. The purified water containing substantially no calcium salts is then delivered through the pipe 37 into the washer 27. I prefer to fill the washer 27 with purified water and to agitate the clay therein for a short period, then allowing it to settle and withdrawing the supernatent water through a pipe 38 having a valve 39. I then close the valve 39, refill the washer and repeat the operation until the clay is free from acid and in a highly activated condition. The initial treatment of the raw clay and gangue with dilute acid for the purpose of separation is extremely important to this washing step of the process. I have found that where the raw clay is mixed with fresh water in the mixer 2, the settling of the treated clay in the washer 27 is very slow and unsatisfactory, making it difficult if not impossible to thoroughly free the treated clay from the acid. On the other hand by mixing the raw clay with dilute sulphuric acid, the settling of the treated clay is quickened and is separated more satisfactorily from the water. This makes it possible to thoroughly work the treated clay free from the acid which is very important in the production of a high grade product.

The clay may then be delivered through a valve 40 and a pipe 41 into a rotary filter 42. The purpose of this filter is to mechanically remove the moisture from the clay and any type of filter suitable for this purpose may be employed. In practice I prefer to use a rotary filter in which a blanket of clay is formed on a screen by means of a vacuum and in which the blanket is continuously scraped off and delivered through a chute 43 into a drier 44. The dried clay is then delivered into a ball mixer 45 in which it is ground to the desired fineness.

By the above described process I produce an activated clay having a high ordinary potency which is not materially destroyed by repeated reactivation.

The process as described above can also be made continuous in order to make the operation more economical when manufacturing on a large scale. In this case the clay, acid and water is fed continuously into the treating tank; and instead of one tank, at least three are employed, the pulp overflowing from one tank into the next one and so on, the outlet of each tank being opposite to the intake of that tank. The greater the number of treating tanks in the series, the more thoroughly and uniformly treated the product obtained. In case the separation of the gangue is necessary, the clay is first mixed with sufficient acid liquor to form a pulp and this is then passed through a continuous classifier, such as the Dorr classifier, and the pulp is then introduced into the first treating tank. As pointed out before, fresh water alone should not be used in the initial mixing, as otherwise the treated clay would not settle out readily. Either spent acid liquor is used or sufficient acid added to the fresh water employed, before the clay is brought into contact with it. Additional acid is added into the treating tank to bring the percentage of acid up to 12% to 20%, depending upon the particular type of clay worked.

The washing of the treated clay can also be performed in a continuous manner, using any well known continuous washing system such as Dorr countercurrent washing system.

I claim as my invention:

1. A method of activating clays which comprises: treating the clays with a solution of an inorganic acid in water; and removing the acid by washing the clay with water substantially free from all calcium compounds.

2. A previously unused activated clay substantially free from water soluble impurities.

3. An activated clay substantially free from alkali earth metal compounds.

4. A method of activating clays which comprises: mixing the clay first with an inorganic acid solution of from 12% to 20% acid strength, to disintegrate the clay and form a pulp; adding a fresh supply of inorganic acid in sufficient quantity to dissolve the soluble constituents of the pulp; agitating the mixture and increasing its temperature slowly to about its boiling point, and then decreasing said temperature slowly to about 160° F.; draining the supernatent liquid from said mixture; washing the remaining pulp with water which is substantially free from soluble impurities; and thereafter separating the activated clay so produced.

5. A method of activating clays which comprises: mixing the clay first with an inorganic acid solution of from 12% to 20% acid strength, to disintegrate the clay and form a pulp; adding a fresh supply of inorganic acid in sufficient quantity to dissolve the soluble constituents of the pulp; agitating the mixture and increasing its temperature slowly to about its boiling point, and then decreasing said temperature slowly to about 160° F.; draining the supernatent liquid from said mixture; washing the remaining pulp with water which is substantially free from calcium compounds; and thereafter separating the activated clay so produced.

6. A method of activating clays which comprises: mixing the clay first with a relatively weak inorganic acid solution to disintegrate the clay and form a pulp; adding a fresh supply of inorganic acid in sufficient quantity to dissolve the soluble constitutents of the pulp; agitating the mixture and increasing its temperature slowly to about its boiling point and then decreasing said temperature slowly to about 160° F.; draining the supernatent liquid from said mixture; washing the remaining pulp with water which is substantially free from soluble impurities; and thereafter separating the activated clay so produced.

7. A method of activating clays which comprises: mixing the clay first with a relatively weak inorganic acid solution to disintegrate the clay and form a pulp; adding a fresh supply of inorganic acid in sufficient quantity to dissolve the soluble constituents of the pulp; agitating the mixture and increasing its temperature slowly to about its boiling point and then decreasing said temperature slowly to about 160° F.; draining the supernatant liquid from said mixture; washing the remaining pulp with water which is substantially free from calcium compounds; and thereafter separating the activated clay so produced.

8. In a method of activating clays with an inorganic acid solution, the step consisting of washing acid-treated clay with water which is substantially free from soluble impurities.

9. In a method of activating clays with an inorganic acid solution, the step consisting of conducting the activating treatment in the presence of a temperature gradually increasing during the first portion of said treatment to near the boiling point of the solution and gradually decreasing during the remaining portion of said treatment the temperature readings being capable of being graphically represented when plotted against time, as a curve.

10. In a method of activating clays with an inorganic acid solution, the step consisting of washing acid-treated clay with water which is substantially free from calcium compounds.

11. In a method of activating clays with an inorganic acid solution, the step consisting of conducting the activating treatment in the presence of an inorganic acid at a temperature gradually increasing during the first portion of said treatment from between 170° F. and 200° F. to near boiling point of the solution and gradually decreasing during the remaining portion of said treatment to between 160° F. and 200° F. the temperature readings being capable of being graphically represented when plotted against time, as a curve.

12. A method of activating clays which comprises, mixing acid clays with water containing an inorganic acid, increasing the temperature of the mixture from a minimum initial temperature to a maximum temperature over a period of time which represents a substantial portion of the time consumed by the activation treatment, subsequently decreasing the temperature to a minimum temperature at which point the activation treatment is stopped, and thereafter separating the activated clay so produced.

13. An activated clay substantially free from calcium compounds.

In testimony whereof, I have hereunto set my hand at Los Angeles, California, this 17th day of May, 1926.

WALTER S. BAYLIS.